United States Patent Office.

URIAL KING MAYO, OF BOSTON, MASSACHUSETTS, ASSIGNOR TO THE BOSTON VEGETABLE ANÆSTHETIC COMPANY, OF PORTLAND, MAINE.

ANÆSTHETIC MIXTURE.

SPECIFICATION forming part of Letters Patent No. 320,150, dated June 16, 1885.

Application filed November 28, 1884. (No specimens.)

*To all whom it may concern:*

Be it known that I, URIAL KING MAYO, of Boston, in the county of Suffolk, of the Commonwealth of Massachusetts, have invented a new and useful Improvement in Anæsthetics; and I do hereby delare the same to be described in the following specification.

My invention relates to a composition of nitrous-oxide gas with medicinal matters to neutralize or prevent evil consequences resulting from the inhalation of such gas, for the production of anæsthesia in the performance of surgical operations, particularly those appertaining to the extraction of teeth.

Nitrous-oxide gas in its normal condition, when administered to a person for the purpose of rendering him insensible to pain, is liable to produce cerebral congestion, irregularity in the action of the heart, paralysis of the mouth, headache, nausea, or spasms. To render the said gas capable of being successfully employed for such purpose, I have been accustomed to combine with it a sedative, consisting of an aqueous alcoholic tincture or infusion of hops and poppies, such being as described in the United States Patent No. 283,800, dated August 28, 1883, and granted to me.

In practice I have found that although the sedative, anodyne, or hypnotic obtained from hops and poppies is with the gas in most if not all cases attended with useful results, it does not properly act in many as an antispasmodic or a diaphoretic. I have therefore sought to discover a composition of the gas with matters sedative and antispasmodic, or such and diaphoretic in action with it, in the production of anæsthesia by inhalation. For this purpose I add to alcohol not only a sufficient quantity of a sedative or sedative matters—such as hops, lady's-slipper, or stramonium—but an antispasmodic—as a quantity of English valerian, for instance. With such may be added to advantage a diaphoretic—as a quantity of skull-cap, for example. In preparing an alcoholic tincture for the purpose I generally add to one quart of alcohol four ounces of hops, four ounces of skull-cap, four ounces of English valerian, four ounces of lady's-slipper, and two ounces of stramonium. Through this alcoholic infusion or sedative and antispasmodic tincture I pass the nitrous-oxide gas in its course from the producing-retort to the gasometer used to contain it. In this way I have combined or mixed with the gas an alcoholic vapor having sedative and antispasmodic, or sedative, antispasmodic, and diaphoretic characteristics.

I do not confine the composition to the precise proportions given for its constituents, as they may be varied somewhat and still be productive of good effects.

I do not herein claim an anæsthetic consisting of nitrous-oxide gas and the vapors of an aqueous alcoholic tincture or infusion of hops and poppies, such being the subject of the aforesaid patent, No. 283,800.

I claim—

1. An anæsthetic composition, substantially as described, for use in surgical operations, &c., consisting of nitrous-oxide gas and the vapor of an alcoholic tincture of hops, stramonium, and valerian, in or about the proportions specified.

2. An anæsthetic compound consisting of nitrous-oxide gas and the vapor of an alcoholic tincture of hops, stramonium, and valerian, and skull-cap, in or about in the proportions specified.

3. An anæsthetic compound, substantially as described, consisting of nitrous-oxide gas and the vapor of an alcoholic tincture of hops, lady's-slipper, and valerian, in or about the proportions specified.

4. An anæsthetic compound, substantially as described, consisting of nitrous-oxide gas and the vapor of an alcoholic tincture of hops, lady's-slipper, valerian, and skull-cap, in or about in the proportions specified.

URIAL KING MAYO.

Witnesses:
R. H. EDDY,
E. B. PRATT.